3,790,508
LIGHT-STABLE POLYURETHANE FOAM FORMED BY REACTION OF A POLYOL AND A MIXTURE OR AROMATIC AND ALIPHATIC POLYISOCYANATES

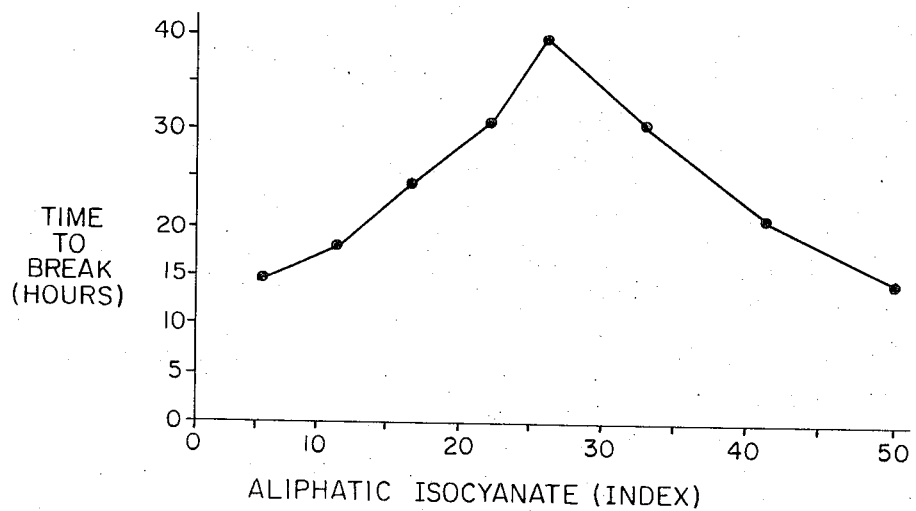

Rocco P. Triolo, Broomall, Pa., assignor to Scott Paper Company
Filed Mar. 20, 1972, Ser. No. 236,092
Int. Cl. C08g 22/18
U.S. Cl. 260—2.5 AT
4 Claims

ABSTRACT OF THE DISCLOSURE

A light-stable polyurethane foam is disclosed comprising the reaction product of a polyol, an aliphatic isocyanate and an aromatic isocyanate. The reaction is carried out in the presence of a blowing agent and a catalyst.

BACKGROUND OF THE INVENTION

Field of the invention

The present invention relates generally to light-stable polyurethane foams and to compositions useful in preparing said foams. More particularly, the invention relates to a light-stable polyurethane foam comprising the reaction product of a polyol, an aliphatic isocyanate and an aromatic isocyanate. The foams are prepared by the one-shot method from a composition comprising, in addition to the polyol and the isocyanate, one or more catalysts and a blowing agent.

Description of the prior art

Foamed polyurethane materials derived from the reaction product of an organic polyisocyanate and an active-hydrogen-containing compound, such as polyols, including polyethers, polyesters, polyoxycarboxy alkylenes, and the like, are well-known in the art. However, these polyurethane foams have a tendency to discolor to an unsatisfactory yellow or brown color during aging, especially when exposed to light.

Several methods have previously been suggested for overcoming the discoloration problem. It is now well-known that polyurethane foams prepared from the reaction of an aromatic isocyanate are more susceptible to discoloration than those prepared from an aliphatic, or an aliphatic-like, isocyanate. As used herein, the term aliphatic isocyanate is meant to include both those isocyanates which are truly aliphatic or alicyclic as well as the aliphatic-like compounds—i.e., those which, although they contain an aromatic ring, react as an aliphatic compound, due primarily to the fact that the isocyanate group is not attached directly to the ring (i.e. xylylene diisocyanate). However, it is also well-known that it is extremely difficult to produce a stable foam using an aliphatic isocyanate especially in a one-shot process at room temperature. A mixed catalyst system useful in preparing foams employing an aliphatic isocyanate is disclosed in U.S. patent application Ser. No. 188,615 entitled, "Flexible, Open-Cell, Non-Discoloring Polyurethane Foam," filed Oct. 12, 1971, by Roland J. Lamplugh and Frederick W. Meisel, Jr. That application is assigned to the same assignee as the present application. However, even with this improved catalyst system, the foaming reaction is somewhat slow. Also, the raw material costs are higher due to the increased cost of aliphatic isocyanate as compared to the aromatic isocyanate.

In U.S. Pat. 3,544,962 entitled "Light-Stable Polyurethanes" issued to Fischer, there is disclosed a composition useful in the preparation of polyurethane films. The composition contains a polyether-aromatic diisocyanate, polyurethane prepolymer, a polyether-4,4'-methylenebis (cyclohexylisocyanate) polyurethane prepolymer, an ultraviolet light screening agent and an antioxidant.

However, there has not heretofore been available a flexible polyurethane foam which could be cheaply prepared by a one-shot method and which would not severely discolor after aging.

SUMMARY OF THE INVENTION

In accordance with the present invention, flexible, polyurethane foams having a reduced tendency to discolor upon exposure to light comprise the reaction product of a polyol, an aliphatic isocyanate, and an aromatic isocyanate. The foams are prepared from a composition comprising, in addition to the polyol and the isocyanates, one or more catalysts and a blowing agent.

BRIEF DESCRIPTION OF THE DRAWING

FIG. 1 is a graph illustrating the relationship between the amount of aliphatic isocyanate employed and the length of time required for the foam to break—i.e., discolor.

DESCRIPTION OF THE PREFERRED EMBODIMENTS

As pointed out above, in accordance with the present invention polyurethane foam is prepared from a composition comprising:

(a) a polyol,
(b) an aliphatic isocyanate,
(c) an aromatic isocyanate,
(d) a blowing agent, and
(e) a catalyst.

Each of the essential components employed in the practice of the present invention is discussed in detail below.

Polyols

Any polyol, including both polyester and polyether polyols, conventionally employed in the preparation of polyurethane foam may be employed in preparing foams in accordance with the present invention. Representative polyester polyols which may be employed include, for example, the reaction product of polyfunctional organic carboxylic acids and polyhydric alcohols. Typical polyfunctional organic carboxylic acids which may be employed in producing polyesters useful in carrying out the present invention include, for example, dicarboxylic aliphatic acids such as succinic, adipic, sebacic, azelaic, glutaric, pimelic and suberic acids and dicarboxylic aromatic acids such as phthalic acid, terephthalic acid, isophthalic acid and the like. Other polycarboxylic acids that can be employed include the "dimer acids" such as the dimer of linoleic acid. Hydroxyl-containing monocarboxylic acids such as ricinoleic acid may also be employed. Alternatively, the anhydrides of any of these acids can be employed in producing the polyesters. Typical polyhydric alcohols that may be employed in producing polyesters useful in carrying out the present invention include, for example, the monomeric polyhydric alcohols such as glycerol, 1,2,6-hexane triol, ethylene glycol, trimethylol propane, trimethylol ethane, pentaerythritol, propylene glycol, 1,3-butylene glycol, and 1,4-butylene glycol.

Representative polyether polyols which may be employed in preparing foams in accordance with the present invention include, for example, the polyalkylene oxide ethers, such as the reaction products of ethylene oxide, propylene oxide, butylene oxide, hexadecyclene oxide, styrene oxide, picolene oxide or methyl glycoside, with a compound containing two or more reactive hydrogens, such as resorcinol, glycerol, trimethylol propane, pentaerythritol, ethylene glycol diethylene glycol, triethylene glycol, and the like. Particularly useful polyethers include polyoxypropylene glycol, polyoxyethylene glycol, polyoxybutylene glycol, polyoxyethyleneoxypropylene glycol, polyoxyethyleneoxybutylene glycol and polyoxypropyleneoxybutylene glycol.

Aliphatic isocyanates

As pointed out above, the isocyanates useful in the practice of this invention are a combination of an aliphatic isocyanate and an aromatic isocyanate. Representative aliphatic isocyanates which may be employed include, for example, dimethyl benzene ω,ω'-diisocyanate (xylylene diisocyanate); 4,4'-methylenebiscyclohexyl diisocyanate and mixtures of isomers thereof; hexamethylene diisocyanate; methylcyclohexylene diisocyanate; diethylbenzene diisocyanate; 3-isocyanatomethyl - 3,5,5 - trimethylcyclohexylisocyanate; 2,2,4 - trimethylhexamethylene diisocyanate; 2,6-diisocyanato methyl caproate lysine diisocyanate, methyl ester; and the like. The expression "Index" is an art recognized term indicating the ratio of the actual amount of isocyanate in the reaction mixture to the theoretical amount of isocyanate needed for reaction with all active hydrogen compounds present in the reaction mixture, multiplied by 100. As can be seen from the drawing, it is especially preferred to employ an amount of aliphatic isocyanate equal to an index of from about 5 to about 40.

Aromatic isocyanate

The aromatic isocyanates useful in carrying out the present invention include any of those which are well-known in the art including, for example, aromatic polyisocyanates having from 2 to 3 isocyanate groups per molecule and from 1 to 3 phenylene rings as the only aromatic cyclic ring systems such as m-phenylene diisocyanate, 2,4-toluene diisocyanate, 2,6-toluene diisocyanate, 3,3'-dimethyl- as well as various other polyisocyanates such as 4,4'-biphenylene diisocyanate, 3,3'-dimethoxy - 4,4 - biphenylene diisocyanate, 4,4'-biphenylene diisocyanate, 3,3'-dichloro-4,4'-biphenylene diisocyanate, triphenylmethane triisocyanate, 1,5-naphthalene diisocyanate, and the like.

Catalysts

Useful catalysts which may be employed include, for example, the tertiary amines such as N-alkylmorpholines, including N-ethylmorpholine, and N,N-dialkylcyclohexylamines, where the alkyl groups are methyl, ethyl, propyl, butyl, etc., also triethylamine, tripropylamine, tributylamine, triamylamine, pyridine, quinoline, dmiethylpiperidine, dimethylhexahydroaniline, diethylhexahydroaniline, the reaction products of N,N'-diethylaminoethanol and phenyl isocyanate, esterimides, 1-methyl-4-(dimethylaminoethyl) piperazine, N - ethylethylenimine, N,N,N',N'-tetramethyl-1,3-butanediamine, triethylamine, 2,4,6-tri(dimethylaminomethyl) phenol, tetramethylguanidine, 2-methylpyrazine, dimethylaniline, and nicotine; and metallic compounds including those of bismuth, lead, tin, titanium, iron, antimony, uranium, cadmium cobalt, thorium, aluminum, mercury, zinc, nickel, cerium, molybdenum, vanadium, copper, manganese, zirconium, etc., examples of which include bismuth nitrate, lead 2-ethylhexoate, lead benzoate, lead oleate, sodium trichlorophenate, sodium propionate, lithium acetate, potassium oleate, tetrabutyl tin, butyl tin trichlorate, stannic chloride, tributyl tin 1-nonylphenate, stannous octoate, stannous oleate, dibutyl tin di(2-ethylhexoate), di(2-ethylhexyl) tin oxide, titanium tetrachloride, tetrabutyl titanate, ferric chloride, antimony trichloride, cadmium diethyl dithiophosphate, thorium nitrate, triphenyl-aluminum, nickelocene, etc. The catalyst component either as a single compound or as a mixture of two or more compounds may be used in conventional amounts, which usually ranges from about 0.05 to about 4 parts of catalyst per 100 parts of polyolisocyanate reactants by weight.

Blowing agents

Polyurethanes are used in both the unfoamed and the so-called "foam" form. In general, a foamed polyurethane, which is the product to which the present invention relates, is formed when low boiling liquids, or normally gaseous blowing agents, or inflatants are generated by or incorporated into the polyurethane-forming reactants. Often the heat of reaction causes these low boiling liquid or gaseous blowing agents to volatilize, thus foaming the composition. In some cases the boiling point of the blowing agent is chosen to be well below room temperature, and the composition can be made to foam even before any substantial reaction between the polyol and the polyisocyanate reactants has occurred or before any heat is evolved. This technique is sometimes called frothing. Useful blowing agent, i.e., foam inducing agents which may be added when foams are desired include water, either alone or admixed with other components, e.g., as an aqueous solution of a tertiary amine catalyst, and the chlorinated and fluorinated alkanes having from 1 to about 2 carbon atoms, such as the chlorofluoromethanes and chlorofluoroethanes, which are commercially available under various trademarks, such as E.I. du Pont de Nemours & Company, Inc.'s "Freon."

When blowing or foaming agents are incorporated into the reactant composition, there may also be incorporated into the mixtures various conventional foam stabilizers to control the amount and quality of the foamed polyurethane obtained. Used for this purpose are various surfactants including various silicone compounds and silicone oil mixtures, e.g., siloxane-oxyalkylene block copolymers sold under various trade names, such as Union Carbide Corporation's "Silicone L–532." For foaming or blowing polyurethane polymers there may be used from about 0.5 to about 50 parts by weight of blowing agent and about 0.1 to 3 parts of the foam stabilizing agent per 100 parts by weight of the polyol.

In preparing foams in accordance with the present invention it is preferred to include in the foam-forming composition an ultraviolet light absorbing compound. Suitable ultraviolet light absorbing compounds include, for example, substituted benzotriazoles such as 2-(3',5'-ditert-butyl-2'-hydroxy phenyl)-5-chloro benzotriazole, 2-(3'-tert-butyl-2'-hydroxy - 5' - methylphenyl) 5 chlorobenzotriazole, and 2-(2'-hydroxy-5'-methylphenyl)benzotriazole, 2,2'-dihydroxy-4,4'-dimethoxy-benzophenone, p-methoxybenzylidene malonic acid dimethyl ester, p-octylphenyl salicylate and resorcinol monobenzoate. As is described in the copending patent application entitled "Improved, Light-Stable, Polyurethane Foam" filed by David J. Kelly on even date herewith and assigned to the same assignee as the present application, it is especially preferred to include, as the ultraviolet light absorbing compound, a substituted benzotriazole.

In carrying out the present invention, the one-shot technique for producing foam is employed at room temperature. In the one-shot method all of the ingredients, that is, the polyol, the aromatic isocyanate, the aliphatic isocyanate, the blowing agent, the catalyst, and any additional components such as the UV absorber and the surfactant are simultaneously mixed with each other by any suitable means and then poured onto a surface where the foaming reaction takes place. Any suitable mixing-type apparatus may be used. The mixing device may have any number of conduits leading thereto for introducing the different ingredients. For example, there may be one conduit for each ingredient or there may be a number less than the number of different ingredients. If the number of conduits is less than the total number of ingredients utilized, of course, it will be necessary to combine several of the ingredients prior to introducing them into the mixer. The ingredients may be combined in any suitable manner, the only requirement being that premature reaction should not occur prior to introducing into the mixer. Thus, the isocyanate and the water, if water is utilized as the foaming agent, would not be combined into a solution and introduced into the mixer for the reason that the isocyanate and the water would prematurely react to form urea groups. Also, the isocyanate and the polyol would not generally be combined prior to introduction into the mixer for the reason that some reaction might occur. However, in certain circumstances, it would be possible for these ingredients to be admixed prior to introduction into the mixer.

A significant advantage of the foams produced in accordance with the present invention is that they do not discolor even upon long exposure to light. The flexible polyurethane foams obtained according to this invention may be used for interlining for apparel, applicators for cosmetics, soaps and lotions, kitchen products, furniture padding, dental products, disposable items, first-aid products, orthopedic and surgical products, decorative products, draperies and all other applications involving either direct or indirect exposure to light.

In order to describe the present invention so that it may be more clearly understood, the following examples are set forth. These examples are set forth primarily for the purpose of illustration, and any specific enumeration of detail contained therein should not be interpreted as a limitation on the concept of this invention. All components in the foam-forming compositions are given in parts by weight.

In order to more conveniently describe the components of the foam-forming compositions utilized in the examples, the components are identified by their trademarks or a representative symbol. The trademarks or symbols used in the examples are identified as follows:

F50 is Fomrez 50, a glycol adipate type polyester polyol available from Witco Chemical Company, New York, N.Y.

LG56 is a polypropylene oxide adduct of glycerol available from Union Carbide Corporation, New York, N.Y.

F1058 is an organic surfactant also available from Witco Chemical Company.

7786 is an organic surfactant available from Witco Chemical Company.

L532 and L540 are polyoxyalkylene siloxane copolymers available from Union Carbide Corporation, New York, N.Y.

DABCO 33LV is a 33⅓% solution of DABCO (1,4 diazabicyclo [2,2,2] octane) in dipropylene glycol.

NEM is N-ethyl morpholine.
DMEA is dimethyl ethanolamine.
MEA is mono ethanolamine.

T26 is primarily dibutyl tin bisstearylmaleate available from M & T Chemicals, Inc., Rahway, N.J. as Thermilite 26.

T9 is stannous octoate.

C6 is a 33⅓% solution of stannous octoate in dioctyl phthalate.

Tinuvin 328 is a substituted benzotriazole available from Ciba-Geigy Corporation, Ardsley, N.Y.

Hylene W is an aliphatic isocyanate also available from Du Pont.

TDI is an 80:20 mixture of the 2,4- and 2,6-isomers of toluene diisocyanate.

The term index" as used herein, and as commonly used in the polyurethane art, is the ratio of the actual amount of isocyanate in the reaction mixture to the theoretical amount of isocyanate needed for reaction with all the active hydrogen containing compounds present in the reaction mixture, multiplied by 100.

The light stability of the foams was determined by exposing the foam sample to light and measuring the time to break. As used herein, the term "break" refers to the time elapsed between exposure of the foam to light and a noticeable discoloration of the foam.

EXAMPLE I

Foams were prepared from the formulations given in Table I.

TABLE I

| | Foam | |
|---|---|---|
| | 1-A | 1-B |
| Components: | | |
| F50 | 100.0 | 100.0 |
| F1058 | 1.2 | 1.2 |
| 7786 | 1.65 | 1.65 |
| NEM | 1.0 | 1.0 |
| DMEA | 0.7 | 0.7 |
| Water | 3.8 | 3.8 |
| Hylene W | | 14.6 |
| TDI | 48.1 | 38.6 |
| Isocyanate index (total) | 100 | 100 |
| Hylene W index | | 20 |
| TDI index | 100 | 80 |

The light stability of each of these foams was evaluated by placing a sample of the foam in a type FDA–RC fadeometer, aviailable from Atlas Electronic Devices Co., Chicago, Ill. and recording the number of hours required for the foam to discolor. The foam identified as Foam 1–A, which is a conventional foam prepared from an aromatic isocyanate, discolored in about 2.5 hours in the fadeometer. The foam identified as Foam 1–B, which was prepared from a combination of an aliphatic isocyanate and an aromatic isocyanate discolored in about 5.0 hours.

EXAMPLE II

To determine the optimum amount of aliphatic isocyanate to be employed in carrying out the present invention, several foams were prepared from the formulations given in Table II.

TABLE II

| | II-A | II-B | II-C | II-D | II-E | II-F | II-G | II-H | II-I |
|---|---|---|---|---|---|---|---|---|---|
| Components: | | | | | | | | | |
| F50 | 100 | 100 | 100 | 100 | 100 | 100 | 100 | 100 | 100 |
| L532 | 1.0 | 1.0 | 1.0 | 1.0 | 1.0 | 1.0 | 2.0 | 1.5 | |
| NEM | 1.0 | 1.0 | 1.0 | 1.0 | 1.0 | 1.0 | 0.5 | | |
| DMEA | 0.7 | 0.7 | 0.7 | 0.7 | 0.7 | 0 7 | 1.25 | | |
| T26 | | | | | | | | 1.0 | 1.5 |
| T9 | | | | | | | | 1.0 | 1.0 |
| MEA | | | | | | | | 1.5 | 2.5 |
| Water | 3.8 | 3.8 | 3.8 | 3.8 | 3.8 | 3.8 | 3.8 | 3.8 | 3.8 |
| Tinuvin 328 | 2.5 | 2.5 | 2.5 | 2.5 | 2.5 | 2.5 | 2.5 | 2.5 | 2.5 |
| Methylene chloride | 2.5 | 2.5 | 2.5 | 2.5 | 2.5 | 2.5 | 2.5 | 2.5 | 2.5 |
| TDI | 46.7 | 44.4 | 42.1 | 39.7 | 37.4 | 35.0 | 32.7 | 28.0 | 23.4 |
| Hylene W | | 3.5 | 7.5 | 10.7 | 14.2 | 17.7 | 21.3 | 28.4 | 35.5 |
| Index (total) | 100 | 100 | 100 | 100 | 100 | 100 | 100 | 100 | 100 |
| Index (TDI) | 100 | 95 | 90 | 85 | 80 | 75 | 70 | 60 | 50 |
| Index (Hylene W) | | 5 | 10 | 15 | 20 | 25 | 30 | 40 | 50 |
| Break (hours) | 10 | 14 | 18 | 21 | 30 | 40 | 30 | 20 | 15 |

The light stability of samples of each of these foams was evaluated as in Example I. The number of hours required for the foam to discolor is also given in Table II. As can be seen from that table, optimum light stability is achieved with a foam having an aromatic isocyanate index of about 75 and an aliphatic isocyanate index of about 25. This foam does not discolor up to about 40 hours aging in the fadeometer. The foams identified as II-H and II-I could only be prepared by the use of a different catalyst system due primarily to the increase amount of aliphatic isocyanate in the formulation. As can be seen from the data in Table II these foams had poorer light stability.

These results are illustrated graphically in FIG. 1.

EXAMPLE III

Foams were prepared from the formulations given in Table III.

TABLE III

| Components: | Foam III-A | Foam III-B | Foam III-C | Foam III-D |
|---|---|---|---|---|
| LG50 | 100 | 100 | 100 | 100 |
| L540 | 1.5 | 1.5 | 1.5 | 1.5 |
| NEM | 1.0 | 1.0 | 1.0 | 1.0 |
| DABCO 33LV | 0.3 | 0.3 | 0.3 | 0.3 |
| C6 | 1.2 | 1.2 | 1.2 | 1.2 |
| Water | 3.5 | 3.5 | 3.5 | 3.5 |
| Tinuvin 328 | | | 1.5 | 1.5 |
| TDI | 43.7 | 35.0 | 43.7 | 35.0 |
| Hylene W | | 13.2 | | 13.2 |
| Index (total) | 100 | 100 | 100 | 100 |
| Index (TDI) | 100 | 80 | 100 | 90 |
| Index (Hylene W) | | 20 | | 20 |
| Break (hours) | 1.0 | 1.5 | 5.0 | 10.0 |

The light stability of each of these foams was evaluated as in Example I and the break time is also given in Table III. As can be seen from that table, Foams III-B and III-D prepared in accordance with the present invention have improved light stability when compared with Foams III-A and III-C, respectively.

What is claimed is:

1. A light-stable polyurethane foam comprising the one-shot reaction product of
   (a) a polyol,
   (b) an aliphatic polyisocyanate,
   (c) an aromatic polyisocyanate,
   (d) a blowing agent, and
   (e) a catalyst in which the aliphatic isocyanate index is equal to from 5 to about 40 and the aromatic isocyanate index is equal to from about 60 to about 95.

2. A foam as claimed in claim 1, in which the polyol is a polyester polyol.

3. A foam as claimed in claim 2, in which the polyester polyol is a glycol adipate polyester polyol.

4. A foam as claimed in claim 1, in which the polyol is a polyether polyol.

References Cited

UNITED STATES PATENTS

| 3,554,962 | 1/1971 | Fischer | 260—77.5 |
| 3,454,505 | 7/1969 | Cross et al. | 260—2.5 |
| 3,351,650 | 11/1967 | Cross et al. | 260—2.5 |
| 3,645,924 | 2/1972 | Fogiel | 260—2.5 |
| 3,523,917 | 8/1970 | Dickert et al. | 260—2.5 |
| 3,590,002 | 6/1971 | Powers | 260—2.5 |

FOREIGN PATENTS

| 846,176 | 8/1960 | Great Britain | 260—2.5 |

DONALD E. CZAJA, Primary Examiner

EUGENE C. RZUCIDLO, Assistant Examiner

U.S. Cl. X.R.

260—2.5 AN, 2.5 AP, 75 NT, 77.5 AT

UNITED STATES PATENT OFFICE
CERTIFICATE OF CORRECTION

Patent No. 3,790,508      Dated February 5, 1974

Inventor(s) R. P. Triolo

It is certified that error appears in the above-identified patent and that said Letters Patent are hereby corrected as shown below:

Column 3, line 50, "dmiethylpiperi-" should be --dimethylpiperi- --

Column 4, line 44, " 5 " should be -- -5- --

Column 5, line 66, "bisstearylmaleate" should be --bis-stearylmaleate--

Column 7, Table III, Column III-D, "90" should be --80--.

Signed and sealed this 1st day of October 1974.

(SEAL)
Attest:

McCOY M. GIBSON JR.
Attesting Officer

C. MARSHALL DANN
Commissioner of Patents